3,702,336
REACTION PRODUCTS OF KETONES WITH CARBONYL-pH₃ COMPLEXES OF CHROMIUM, MOLYBDENUM, AND TUNGSTEN
Ulrich Klabunde, West Chester, Pa., assignor to E. I. du Pont de Nemours and Company, Wilmington, Del.
No Drawing. Filed Dec. 10, 1970, Ser. No. 97,009
Int. Cl. C07f 11/00; C23c 11/00
U.S. Cl. 260—429 R    17 Claims

ABSTRACT OF THE DISCLOSURE

Chromium, molybdenum, or tungsten carbonyl phosphines are reacted with ketones to give carbonyl(hydroxyhydrocarbylphosphine)metal compounds. The products are useful for preparing adherent metallic coatings on a substrate by thermal decomposition.

BACKGROUND OF THE INVENTION

Field of the invention

This invention relates to new hydroxyhydrocarbylphosphine carbonyl derivatives of chromium, molybdenum, and tungsten.

Description of prior art

Barlow and Holywell, J. Organometallic Chem., 16, 439 (1969), disclose recrystallization of $$(CO)_4Mo(PH_3)_2$$

from a mixture of acetone and water. They also disclose a solution of this compound in acetone for a PMR determination. There is no disclosure or suggestion of any reaction of acetone with the molybdenum compound.

Fischer et al., Angew Chem., 81, 397 (1969), disclose determination of the ¹H—NMR spectrum of $$(CO)_3Cr(PH_3)_3$$

in hexadeuteroacetone. There is no disclosure or suggestion of any reaction between the two compounds.

British Patent 913,574 (Farbwerke Hoechst, 1962) discloses reaction products of salts of metals of groups I–B, II–B, and VIII with phosphine as catalysts for the reaction of phosphine with a variety of aldehydes. No specific phosphine-metal salt complexes of this type are disclosed, and there is no mention of any metals of the group containing chromium, molybdenum, and tungsten.

DESCRIPTION OF THE INVENTION

The products are compounds having a formula of the group (1)  $(CO)_5MPH_2-\underset{R^1}{\overset{R}{\underset{|}{C}}}-OH$ (2) 

(3) 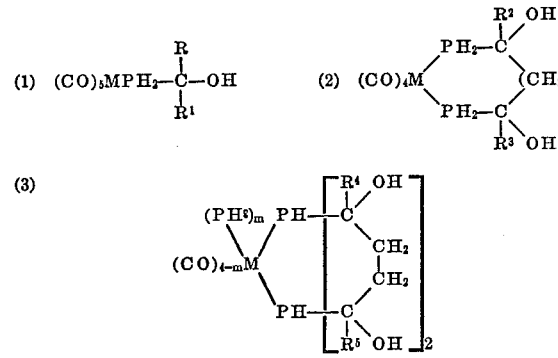

wherein:
M is chromium, molybdenum, or tungsten;
R is lower alkyl of up to 8 carbons;
R¹ is lower alkyl or CH₂COR;
n is 0 or 1;

R² and R³ are the same or different and are lower alkyl of up to 8 carbons or, when n is 0, aryl or alkaryl of up to 10 carbons; and, when n is 0, R² and R³ taken together can be tetramethylene;
m is 0 or 1, preferably 0; and
R⁴ and R⁵ are the same or different and are lower alkyl of up to 8 carbons.

The products can be named as carbonyl(hydroxyhydrocarbylphosphine)metals. For example, the product of Formula 1 wherein R and R¹ are methyl and M is chromium, (CO)₅CrPH₂C(CH₃)₂OH (Example 1), is pentacarbonyl(2 - hydroxy-2-propylphosphine)chromium. Because of the complexity of some of the products, especially those of Formula 3, the products of the invention will hereinafter be designated by their formulas.

Preparation of the products

The products of the invention are prepared from the corresponding carbonyl(PH₃)metals and the appropriate monoketones or diketones in an inert atmosphere such as nitrogen in the presence of water or a base. The carbonylphosphinemetal compounds are old as shown in the prior art mentioned above.

Thus, products of Formula 1 are prepared from a pentacarbonyl(phosphine) metal and a ketone of the formula RCOR¹. The equation for the reaction is (4) 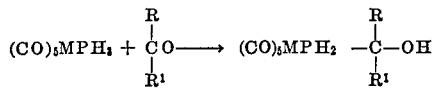

Products of Formula 2 are prepared from a tetracarbonylbis(phosphine)metal and a diketone of the formula R²CO(CH₂)ₙCOR³. The reaction is represented by the equation (5) 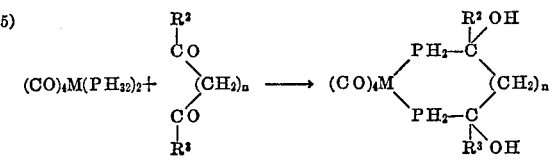

Products of Formula 3 are prepared by reacting a tetracarbonylbis(phosphine)metal or a tricarbonyltris(phosphine)metal with two moles of a diketone of the formula R⁴COCH₂CH₂COR⁵. This reaction is represented by the equation (6) 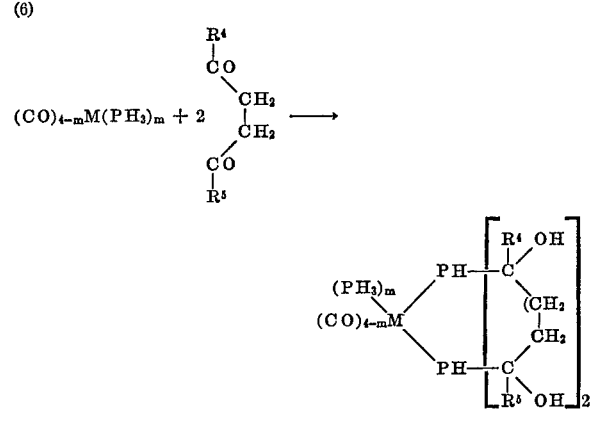

The mole ratio of reactants is usually approximately that dictated by the stoichiometry of the reaction. Moderate excesses of either reactant, i.e., up to about 100%, can be used if desired. Higher excesses can be used, but no particular advantage results. If one reactant is used in excess, it is usually the ketone, since most ketones are cheaper and more easily removed from the final reaction mixture than are the metal-containing reactants.

The process is carried out in the presence of a catalyst, which can be water or a base. Alkali-metal hydroxides and tri(lower alkyl)amines are suitable bases. Among the alkali-metal hydroxides, sodium hydroxide and potassium hydroxide, particularly sodium hydroxide, are preferred because of availability. In the trialkylamines that are operable as bases, the alkyl groups can be the same or different. Preferably they are the same, because of availability. Examples are: trimethylamine, triisopropylamine, tris(2 - ethylhexyl)amine, N,N - diethylisobutylamine, N-methyl - N - propylpentylamine, and tris(sec-butyl)amine. Water is a particularly suitable catalyst in the preparation of products of Formula 1.

The mole ratio of base to metal-containing reactant can vary quite broadly. It can be as high as 10/1 and as low as about 1/100. Usually it is between about 1/1 and 1/20. The relatively high ratios, e.g., from about 1/1 to 10/1 are usually employed when water is the catalyst.

A solvent is usually used in the process. Preferred solvents are ethers, such as ethylether, phenylether, dioxane, 1,2-dimethoxyethane, and tetrahydrofuran. Other types of solvents which can be used include hydrocarbons, such as xylene, benzene, ethylbenzene, hexane, heptane, and cyclohexane; and lower alkanols, such as methyl, ethyl, and isopropyl alcohols. When the ketone is a liquid at the reaction temperature, excess ketone can function as a solvent.

The process can be carried out at a temperature in the range of about 20° C to 120°C. Preferably the temperature will be about 20-60° C., and many embodiments of the process are conducted at ordinary temperatures (20-30° C.).

Atmospheric pressure is usually employed for convenience. Higher or lower pressures can be used, but no advantage results. The time required will depend on the reactants and on the temperature. It can be as short as a few minutes or as long as about two days. Usually it is about 1-2 hours.

The inert atmosphere for conducting the reaction can be any normally inert gas such as nitrogen, argon, krypton and the like.

The prepared products are usually dry solids stable in air. When in solution however they slowly decompose in the presence of air.

The products can be isolated by conventional procedures. Sometimes it is advantageous, but not required, particularly when the base is an alkali-metal hydroxide, to make the reaction mixture neutral or slightly acid before work-up.

The products are crystalline solids and are soluble in a variety of organic solvents. Upon heating at their melting points or higher they decompose to form the free metals.

The following examples illustrate the products and processes of the invention. All infrared spectra were determined on mineral-oil mulls.

SPECIFIC EMBODIMENTS OF THE INVENTION

The following are illustrative examples of the invention in which all parts are by weight except where otherwise stated.

Example 1

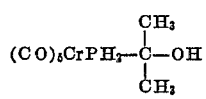

$R_1 = CH_3$
$R = CH_3$
$M = Cr$

A solution containing 40 ml. acetone, 2 ml. of $H_2O$, and 3.5 g. of $Cr(CO)_5PH_3$ was kept at room temperature for about 18 hours. The solvent was removed under reduced pressure and the oil was taken up in hot hexane. From this solution, on cooling with solid carbon dioxide, $$(CO)_5CrPH_2C(CH_3)_2OH$$

separated in pale yellow crystals which melted at 43.5–45.5° C. The yield was 3.0 g. (80%).

*Analysis.*—Calcd. for $C_8H_9CrO_6P$ (percent): C, 33.8; H, 3.19; P, 10.90; Cr, 18.3. Found (percent): C, 33.9; H, 3.30; P, 10.87; Cr, 17.5.

The IR spectrum showed $\nu_{OH}$ at 3500 (m.) cm.$^{-1}$, $\nu_{PH}$ at 2350 (m.) cm.$^{-1}$, $\nu_{CO}$ at 2080 (s.), and 1950 (v.s., br.) cm.$^{-1}$. The $^1H$ NMR spectrum (benzene-$d_6$) showed the $PH_2$ resonances at $\tau$ 6.34 as a doublet, $J_{PH} = 318.5$ Hz.; the $CH_3$ resonances at $\tau$ 8.99 as a doublet, $J_{PCCH3} = 14.0$ Hz.; and the OH resonances at $\tau$ 8.99 as a doublet, $J_{PCOH} = 7.5$ Hz.

If $(CO)_5MoPH_3$ is substituted for $(CO)_5CrPH_3$ in essentially the process of Example 1, the product is $$(CO)_5MoPH_2C(CH_3)_2OH$$

Other ketones can be substituted for acetone, such as 2,6-dimethyl-4-heptanone, 2-decanone, 2-butanone, and 2,2-dimethyl-3-pentanone. For example, with 2,2-dimethyl-3-pentanone the product will be

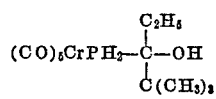

Example 2

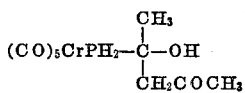

$R_1 = CH_3$
$R = CH_3$
$M = Cr$

To a solution containing 80 ml. tetrahydrofuran, 16.0 g. (0.071 mole) of $Cr(CO)_5PH_3$, and 20 ml. (0.19 mole) of 2,4-pentadione, 40 ml. of water containing 0.8 g. of NaOH was added. The two phases were stirred vigorously for 30 min. at room temperature. After addition of 200 ml. of ethyl ether and 100 ml. of an aqueous NaCl solution, the phases were separated, and the organic phase was washed twice with water. Removal of the ether under reduced pressure led to an oil that solidified on addition of hexane. The solid was extracted with benzene, the extracts were evaporated, and the residual solid was recrystallized from hot hexane. The crystals of $$(CO)_5CrPH_2C(CH_3)OHCH_2COCH_3$$

were dried at 25°/1µ/5 hr. Yield: 10.3 g. The title compound melted at 70–72° C. It was soluble in hexane, benzene, methylene chloride, and ether.

*Analysis.*—Calcd for $C_{10}H_{11}CrO_7P$ (percent): C, 36.8; H, 3.40; Cr, 15.9; P, 9.50. Found (percent): C, 36.3; H, 3.02; Cr, 16.0; P, 9.53.

The IR spectrum of the complex showed $\nu_{OH}$ at 3500 (m.$^1$) cm.$^{-1}$, $\nu_{PH}$ at 2350 m.) cm.$^{-1}$, $\nu_{C\equiv O}$ at 2080 s.) and 950 (v.s., br.) cm.$^{-1}$, and $\nu_{C=O}$ at 1700 s.) cm.$^{-1}$. The $^1H$ NMR spectrum of a 38% weight/weight acetone-$d_6$ solution showed the PH resonances at $\tau$ 5.39 as a doublet, $J_{PH} = 323$ Hz. a single $CH_3$ resonance at $\tau$ 7.82 another $CH_3$ resonance at 8.49 as a doublet, $J_{PCCH3} = 14$ Hz. the $CH_2$ resonances at; $\tau$ 6.93 as a doublet with $J_{PCCH2} = 3$ Hz. and OH resonances at $\tau$ 7.0 and a doublet a $\tau$ 4.97 with $J_{PCOH} = 6$ Hz. The intensity of the two OH resonances is variable on dilution of the solution the absorption at; $\tau$ 7.0 gains in intensity and moves up field.

If $(CO)_5 WPH_3$ is substituted for $(CO)_5CrPH_3$ in essentially the process of Example 2, the product $$(CO)_5WPH_2C(CH_3)OHCH_2COCH_3$$

will be obtained. If 5,7-undecanedione is substituted for 2,4-pentanedione, the product will be

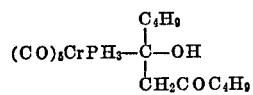

Example 3

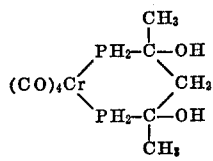

$R^2 = CH_3$
$R^3 = CH_3$
$M = Cr$
$n = 1$

To a solution containing 100 ml. tetrahydrofuran, 5.0 g. (0.022 mole) of cis-Cr(CO)$_4$(PH$_3$)$_2$, and 5 ml. (0.048 mole) of 2,4-pentanedione, 1.0 g. (0.025 mole) of NaOH in 10 ml. of water was added. The two phases were stirred under nitrogen for 1.5 hr. at 25° C. Enough concentrated hydrochloric acid was added to make the solution just acidic. After removal of the solvent under reduced pressure, 200 ml. of ethyl ether was added. This solution was extracted twice with water and dried with anhydrous Na$_2$SO$_4$. Removal of the ether under reduced pressure produced 5.3 g. of a pale yellow powder that was recrystallized from hot toluene. The air-stable, pale yellow crystals of (CO)$_4$Cr[PH$_2$C(CH$_3$)OH]$_2$CH$_2$ (2.5 g.) were dried at 25°/1µ/2 hr. They melted at 176.0–177.5° C.

*Analysis.*—Calcd. for C$_9$H$_{14}$CrO$_7$P$_2$ (percent): C, 32.6 H, 4.22 Cr, 15.6; O, 29.0; P, 18.7, M.W. 324. Found (percent): C, 32.6; H, 4.11; Cr, 15.4; O, 28.8; P, 18.4, M.W. 332 (cryoscopy in benzene)

The IR spectrum showed $\nu_{OH}$ at 3250 (m., br.) cm.$^{-1}$; $\nu_{PH}$ at 2340 (m.) cm.$^{-1}$ and $\nu_{CO}$ at 2010 (s.); and 1900 (v.s., br.) cm.$^{-1}$. The $^1$H NMR spectrum (acetone-d$_6$) showed the CH$_3$ resonances at $\tau$ 8.33 as a doublet with $J_{PCCH} = 9$ Hz.; the CH$_2$ resonances at $\tau$ 7.79 as a multiplet; two OH resonances at $\tau$ 4.07 and $\tau$ 6.63; two sets of PH multiplets at $\tau$ 5.27 with $J_{PH} = 310$ Hz. $\tau$ 5.59 with $J_{PH} = 346$ Hz. The $^{31}$P NMR spectrum (acetone-d$_6$ with H$_3$PO$_4$ as the external reference) showed a triplet at +10.1 p.p.m. with $J_{PH}$~320 Hz.

Substitution of (CO)$_4$Mo(PH$_3$)$_2$ for (CO)$_4$Cr(PH$_3$)$_2$ is essentially the process of Example 3 yields (CO)$_4$Mo[PH$_2$C(CH$_3$)OH]$_2$CH$_2$ as the product. If 2,4-undecanedione is used in place of 2,4-pentanedione, the product will be

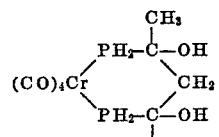

Example 4

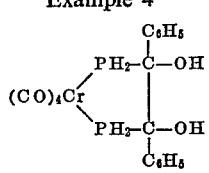

$R^2 = C_6H_5$
$R^3 = C_6H_5$
$M = Cr$
$n = 0$

A solution containing 200 ml. tetrahydrofuran, 10.0 g. (0.043 mole) of cis-Cr(CO)$_4$(PH$_3$)$_2$, 9.66 g. (0.046 mole) of diphenylethanedione and two drops of triethylamine was heated to reflux temperature under nitrogen. After removal of the solvent under reduced pressure, the solid was taken up in ether and the mixture was treated with activated charcoal and filtered. Hexane was added to the filtrate, and it and the ether were removed under reduced pressure. The residual solid was extracted with hot hexane. It was dissolved in 150 ml. hot methanol, 50 ml. of concentrated aqueous hydrochloric acid was added, and the mixture was cooled. The solid was collected by filtration and dried at 26°/1µ/5 hr., to give 16.2 g. (85%) of yellow crystals of (CO)$_4$Cr[PH$_2$C(C$_6$H$_5$)OH]$_2$. After recrystallization from hot toluene, the product melted at 183° C. with decomposition.

*Analysis.*—Calcd. for C$_{18}$H$_{16}$CrO$_6$P$_2$ (percent): C, 48.8; H, 3.64; O, 21.7; P, 14.0. Found (percent): C, 49.4; H, 3.73; O, 21.6; P, 13.6.

The IR spectrum showed $\nu_{OH}$ at 3520 (m.) cm.$^{-1}$, $\nu_{PH}$ at 2360 (m.) cm.$^{-1}$, and $\nu_{CO}$ at 2010 (s.) and 1900 (vs., br.) cm.$^{-1}$. Other absorptions were found at 1600 (w.), 1490 (m., sh.), 1445 (m., sh.), 1370 (m.), 1290 (w.), 1245 (m.), 1160 (m.), 1095 (m., 1090 (m.), 1035 (m.), 1020 (s.), 980 (m.), 920 (m.), 888 (m.), 852 (m.), 825 (s.), 778 (s.), and 772 (s.) cm.$^{-1}$.

Other α-diketones, such as bis(1-naphthyl)ethanedione, 1-phenyl-1,2-pentaedione, and bis(m-tolyl)ethanedione, can be substituted for diphenylethanedione in the process of Example 4 to give products of the invention. For example, with 1-phenyl-1,2-pentanedione the product will be

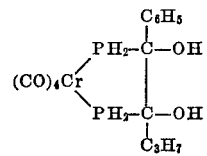

When the reaction mixture was stirred at 25° C. for 30 minutes instead of being heated to reflux briefly, the yield was 48%.

Example 5

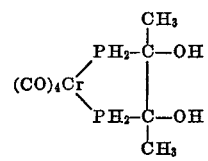

$R^2 = CH_3$
$R^3 = CH_3$
$M = Cr$
$n = 0$

A solution containing 250 ml. ethyl ether, 7.2 g. (0.031 mole) of cis-Cr(CO)$_4$(PH$_3$)$_2$, 5 ml. (0.055 mole) of 2,3-butanedione, and 1 ml. of triethylamine was allowed to stand for 1 hr. Evaporation of the ether under reduced pressure gave an oil. The oil was redissolved in ether, and the solution was washed with 100 ml. of a concentrated aqueous solution of Ba(OH)$_2$ and dried with anhydrous Na$_2$SO$_4$. Afater removing the ether under reduced pressure, the yellow solid was extracted with hot hexane. The solid was dissolved in 100 ml. of hot ether to which 100 ml. of hexane was added. Upon reduction of the volume under reduced pressure, 1.5 g. of (CO)$_4$Cr[PH$_2$C(CH$_3$)OH]$_2$ precipitated as a pale yellow solid and was collected. The product darkened at 182° C. and melted at 185–187° C. with decomposition.

*Analysis.*—Calcd for C$_8$H$_{12}$CrO$_6$P$_2$ (percent): C, 30.2; H, 3.8; P, 19.5. Found (percent): C, 30.3; H, 3.6; P, 19.2.

The IR spectrum of the complex showed $\nu_{OH}$ at 3520 (m.) cm.$^{-1}$, $\nu_{PH}$ at 2350 (m.) cm.$^{-1}$, and $\nu_{CO}$ at 2020 (s.) and 1880 (v.s., br.) cm.$^{-1}$. The $^1$H NMR spectrum (acetone-d$_6$) showed two sets of PH resonances at $\tau$ 5.62 as a doublet of doublets, $J_{PH} = 330$ Hz. and $J_{P'H}$~4 Hz.; and at $\tau$ 5.17 as a doublet of doublets, $J_{P'H'} = 332$ Hz. and $J_{PH'} \sim 4$ Hz.; the CH$_3$ resonances at $\tau$ 8.23 as a doublet, $J_{PCCH_3}=8$ Hz.; and the OH resonances at $\tau$ 6.77 and $\tau$ 4.10 as a doublet, $J_{PCOH}=4$ Hz.

2,3 - Undecanedione, 3,4 - hexanedione, and other α-diketones can be substituted for 2,3 - butanedione in essentially the process of Example 5 to give products of the invention. For example, 2,3-undecanedione will give

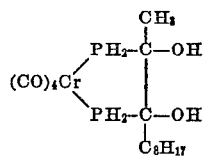

Example 6

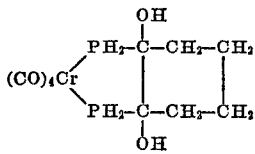

$R^2$ and $R^3$=CH$_2$—CH$_2$—CH$_2$—CH$_2$
M=Cr
n=0

A solution containing 100 ml. tetrahydrofuran, 7.5 g. (0.032 mole) of cis-Cr(CO)$_4$(PH$_3$)$_2$, 4.3 g. (0.036 mole) of 1,2-cyclohexanedione, and 0.3 ml. of triethylamine was allowed to stand at 25° C. for 14 hours. After the solvent was removed under reduced pressure, the oil was dissolved in a minimum amount of benzene, and chromatographed on a 15 x 2.5 cm. column filled with Woelm® anionotropic aluminum oxide, grade III, with benzene as the eluent. The yellow solid (6.4 g.; two fractions) thus obtained was dissolved in hot toluene to which hexane was added. Upon cooling to room temperature, the compound formulated above precipitated as a pale yellow solid that was collected. It melted at 185° C. with decomposition.

*Analysis.*—Calcd. for C$_{10}$H$_{14}$CrO$_6$P$_2$ (percent): C, 34.8; H, 4.64; O, 27.7; P, 17.9. Found (percent): C, 34.9; H, 4.16; O, 27.2; P, 17.8.

The IR spectrum showed $\nu_{OH}$ at 3600 (m.) cm.$^{-1}$, $\nu_{PH}$ at 2370 (m.) cm.$^{-1}$, and $\nu_{CO}$ at 2020 (s.) and 1900 (v.s., br.) cm.$^{-1}$. The $^1$H NMR spectrum (acetone-d$_6$) showed the C—H (cyclohexane) resonances as broad absorbances at $\tau$ 8.50 and $\tau$ 7.75; the two OH resonances at $\tau$ 6.73 and $\tau$ 5.23; and two sets of PH resonances at $\tau$ 5.78 as doublet of doublets, $J_{PH}=316$ Hz., $J_{P'H}=3$ Hz., and at $\tau$ 5.37 as doublet of doublets, $J_{PH}=321$ Hz., $J_{P'H}=3$ Hz. The $^{31}$P NMR spectrum (acetone-d$_6$ with H$_3$PO$_4$ as an external reference) showed a triplet at −11.8 p.p.m. $J_{PH} \simeq 320$ Hz.

If (CO)$_4$W(PH$_3$)$_2$ is substituted for (CO)$_4$Cr(PH$_3$)$_2$ in essentially the process of Example 6, the product will have the structure shown above, with tungsten in place of chromium.

Example 7

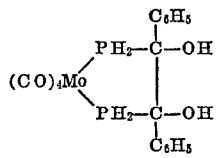

$R^2$=C$_6$H$_5$
$R^3$=C$_6$H$_5$
M=Mo
n=0

A solution containing 100 ml. tetrahydrofuran, 5.0 g. (0.018 mole of cis-Mo(CO)$_4$(PH$_3$)$_2$, 3.8 g. (0.018 mole) of diphenylethanedione and 0.5 ml. of triethylamine was allowed to stand for 30 min. The solvent was removed under reduced pressure, the orange-red solid was dissolved in hot toluene (about 100 ml.) and on addition of hexane a brown solid was obtained. The solid was chromatographed on Woelm® aluminum oxide, anionotropic, grade III, and yielded (CO)$_4$Mo[PH$_2$C(C$_6$H$_5$)OH]$_2$ as a pale yellow powder, identified by comparison of its IR spectrum with that of the product of Example 4.

The IR spectrum showed $\nu_{OH}$ at 3500 (m.) cm.$^{-1}$, $\nu_{PH}$ at 2375 (m.) cm.$^{-1}$, and $\nu_{CO}$ at 2020 (s.) and 1920 (v.s., br.) cm.$^{-1}$. Other absorptions were found at 1600 (w.), 1490 (m., sh.), 1445 (m., sh.), 1370 (m.), 1290 (w.), 1245 (m.), 1160 (m.), 1095 (m.), 1090 (m.), 1035 (m.), 1020 (s.), 1000 (w., sh.), 980 (m.), 920 (w.), 888 (m.), 852 (m.), 825 (s.), 778 (s.), and 772 (s.) cm.$^{-1}$.

If bis (2,4 - xylyl)ethanedione is substituted for diphenylethanedione in the procedure of Example 7, the product will be

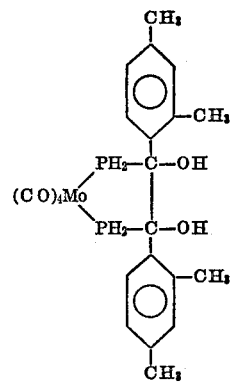

Example 8

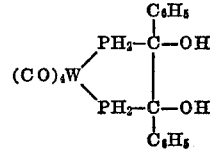

$R^2$=C$_6$H$_5$
$R^3$=C$_6$H$_5$
M=W
n=0

A solution containing 200 ml. tetrahydrofuran, 5 g. (0.014 mole) of cis-W(CO)$_4$(PH$_3$)$_2$, 3 g. (0.014 mole) of diphenylethanedione and 1 ml. of triethylamine was allowed to stand at 25° C. for 2 hr. A brown oil was obtained after the solvent was removed under reduced pressure. Off-white crystals of (CO)$_4$W[PH$_2$C(C$_6$H$_5$)OH]$_2$ (2.3 g.) were obtained by cooling a methylene chloride solution of the oil. They were recrystallized from methylene chloride. The product was identified by comparison of its IR spectrum with that of the product of Example 4. The IR spectrum showed $\nu_{OH}$ at 3500 (m.) cm.$^{-1}$, $\nu_{PH}$ at 2375 (m.) cm.$^{-1}$, and $\nu_{CO}$ at 2025 (s.), 1940 (v.s.) and 1900 (v.s.). Other absorptions were found at 1600 (w.), 1490 (m., sh.), 1445 (m., sh.), 1370 (m.), 1290 (w.), 1245 (m.), 1160 (m.), 1095 (m.), 1090 (m.), 1035 (m.), 1020 (s.), 980 (m.), 920 (w.), 888 (m.), 852 (m.), 825 (s.), 778 (s.), and 772 (s.) cm.$^{-1}$.

If bis(p-ethylphenyl)ethanedione is substituted for diphenylethanedione in the process of Example 8, the product will be

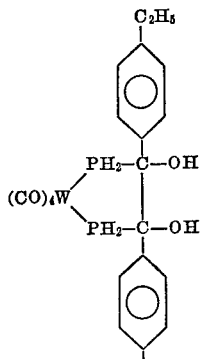

Example 9

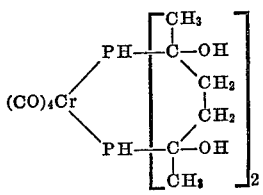

$R^4 = CH_3$
$R^5 = CH_3$
$M = Cr$
$m = 0$

To a solution containing 50 ml. tetrahydrofuran, 5.26 g. (0.0227 mole) of cis-Cr(CO)$_4$(PH$_3$)$_2$ and 4.0 ml. (0.030 mole) of 2,5-hexanedione, 10 ml. of water containing 3 g. (0.075 mole) of NaOH was added. The two phases were stirred at 26° C. for 1 hr. After the solvent had been removed under reduced pressure, 200 ml. of ether and 100 ml. of water was added; the aqueous phase was acidified with concentrated hydrochloric acid and the two phases mixed. The ether phase was twice extracted with water and chromatographed on Woelm® anionotropic aluminum oxide, grade III. After removal of the ether, the residue was recrystallized from hot toluene. The pale yellow needles were collected, washed with hexane, and dried at 25°/1μ/16 hr., to give 4.1 g. of the compound formulated above. The product melted at 171.5–173.0° C.

*Analysis.*—Calcd. for C$_{16}$H$_{26}$CrO$_8$P$_2$ (percent): C, 41.7; H, 5.69; O, 27.8; P, 13.50. Found (percent): C, 41.6; H, 5.69; O, 27.1; P, 12.8.

The IR spectrum showed $\nu_{OH}$ at 3270 (m.) cm.$^{-1}$, $\nu_{PH}$ at 2300 (m.) cm.$^{-1}$, and $\nu_{CO}$ at 2015 (s.) and 1910 (v.s., br.) cm.$^{-1}$. The $^1$H NMR spectrum (acetone-d$_6$) showed the CH$_3$ resonances at τ 8.42 as a doublet J$_{PCCH3}$=9.0 Hz.; the CH$_2$ resonances at τ 7.92 as a doublet, J$_{PCCH2}$=6.5 Hz.; the OH resonances of τ 6.95 and τ 4.30; and the P-H resonance at τ 5.47 as a doublet, J$_{PH}$=318 Hz. The $^{31}$P NMR spectrum (acetone-d$_6$, H$_3$PO$_4$ external reference) showed a doublet centered at −78.3 p.p.m., J$_{PH}$≈320 Hz.

Other 1,4-diketones, such as 5,8-dodecanedione and 3,8-diethyl-4,7-decanedione, can be substituted for 2,5-hexanedione in essentially the procedure of Example 9 to give products of the onvention. For example, with 5,8-dodecanedione the product will have the structure

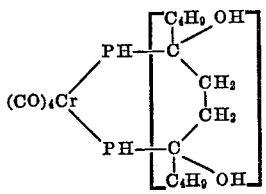

Example 10

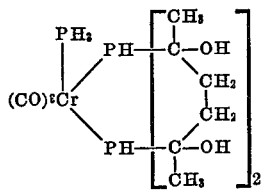

$R^4 = CH_3$
$R^5 = CH_3$
$M = Cr$
$m = 1$

To a solution containing 100 ml. tetrahydrofuran, 4.0 g. (0.017 mole) of Cr(CO$_3$(PH$_3$)$_3$ and 6 ml. of 2,5-hexanedione, 40 ml. of water containing 1 g. (0.025 mole) of NaOH was added. The phases were stirred for 10 min. under nitrogen. After the addition of 5 ml. of concentrated hydrochloric acid, 200 ml. of H$_2$O and 200 ml. of CH$_2$Cl$_2$, the phases were separated. The organic phase was once extracted with water, dried with anhydrous Na$_2$SO$_4$, reduced to half its original volume, and chromatographed on Woelm® anionotropic aluminum oxide, grade III. After evaporation of the solvent, the yellow solid was recrystallized from a methylene chloride/ether/hexane mixture. The yellow crystals were dried at 25°/0.1μ/5 hr. to give 1.3 g. of the compound formulated above, which melted at 156.5–158.0° C. with decomposition.

*Analysis.*—Calcd. for C$_{15}$H$_{29}$CrO$_7$P$_3$ (percent): C, 38.6; H, 6.3. Found (percent): C, 38.1; H, 6.3.

The IR spectrum showed $\nu_{OH}$ at 3300 (m.) cm.$^{-1}$, $\nu_{PH}$ at 2310 (m.) and 2330 (w., sh.) cm.$^{-1}$, and $\nu_{CO}$ at 2020 (w.), 1950 (s.), 1905 (w.) and 1850 (v.s.) cm.$^{-1}$. The $^1$H NMR spectrum (acetone-d$_6$; separately prepared sample) showed the CH$_3$ resonances centered at τ 8.77 as a multiplet consisting of 4 lines; the CH$_2$ resonances centered at τ 7.92, as a broad multiplet; two OH resonances at τ 7.30 and τ 4.63; the PH$_3$ resonances at τ 6.43 as a doublet of triples J$_{PH}$=308 Hz., J$_{P'H}$=7 Hz.; P'H' resonances at ca. τ 5.4 as a doublet of doublets J$_{P'H'}$≈316 Hz., J$_{PH'}$=5 Hz. Upon addition of D$_2$O the two OH resonances collapse to give a single resonance at τ 3.35.

If 3,6-octanedione is substituted for 2,5-hexanedione in the procedure of Example 10, the product formed will have the structure

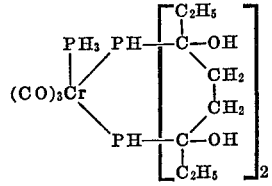

All the products of the invention are useful for the production of adherent metallic coating on a substrate by thermal decomposition. As shown by the examples below the substrate is glass but other substrates such as ceramics, metal, wood, heat resistant plastics, etc. may be used. The deposited metal may be in a single continuous sheet or in discontinuous decorative patterns.

As shown in the following examples, the products of the invention are useful for the preparation of adherent metallic coatings by thermal decomposition.

Example A

A round-bottomed flask having a long neck and containing a small amount of (CO)$_4$Cr[PH$_2$C(C$_6$H$_5$)OH]$_2$ (Example 4) was heated in a current of hot air. The compound became brown, and a colorless liquid condensed in the neck of the flask. The flask was then heated with a free flame, and a mirror of metallic chromium formed on the inner walls.

Example B

The procedure of Example A was repeated with a flask containing a small amount of $$(CO)_5CrPH_2C(CH_3)OHCH_2COCH_3$$

(Example 2). A metallic chromium mirror formed on the inner wall of the flask.

Example C

The procedure of Example A was repeated with a small sample of $(CO)_4Cr[PH_2C(CH_3)_2OH]_2$ (Example 5). Again a metallic chromium mirror was formed on the inner wall of the flask.

The embodiments of the invention in which an exclusive property or privilege is claimed are defined as follows:

1. Carbonyl(hydroxyhydrocarbylphosphine)metal compounds having a formula of the group $$(CO)_5MPH_2-\underset{R^1}{\overset{R}{\underset{|}{C}}}-OH, \quad (CO)_4M\overset{PH_2-\overset{R^2}{\underset{|}{C}}\overset{OH}{\diagdown}}{\underset{PH_2-\overset{|}{\underset{R^3}{C}}\diagdown OH}{\diagup}}(CH_2)_n$$

and $$\underset{(CO)_{4-m}M}{\overset{(PH_3)_m}{\diagdown}}\left[\begin{array}{c}PH-\overset{R^4}{\underset{|}{C}}\overset{OH}{\diagdown}\\(CH_2)_n\\CH_2\\PH-\overset{|}{\underset{R^5}{C}}\diagup OH\end{array}\right]_2$$

wherein:
M is chromium, molybdenum, or tungsten;
R is lower alkyl of up to 8 carbons;
$R^1$ is lower alkyl or $CH_2COR$;
$n$ is 0 to 1;
$R^2$ and $R^3$ are the same or different and are lower alkyl of up to 8 carbons or, when $n$ is O, hydracarbly aryl or alkaryl of up to 10 carbons; and, when $n$ is 0, $R^2$ and $R^3$ taken together can be teteramethylene;
$m$ is 0 or 1, and
$R^4$ and $R^5$ are the same or different and are lower alkyl of up to 8 carbons.

2. Compounds of claim 1 having the formula $$(CO)_5MPH_2-\underset{R^1}{\overset{R}{\underset{|}{C}}}-OH$$

wherein M, R and $R^1$ are as defined in claim 1.

3. Compounds of claim 1 having the formula $$(CO)_4M\overset{PH_2-\overset{R^2}{\underset{|}{C}}-OH}{\underset{PH_2-\overset{|}{\underset{R^3}{C}}-OH}{\diagdown}}(CH_2)_n$$

wherein M, $R^2$, $R^3$ and $n$ are as defined in claim 1.

4. Compounds of claim 1 having the formula $$\underset{(CO)_{4-m}M}{\overset{(PH_2)_m}{\diagdown}}\left[\begin{array}{c}PH-\overset{R^4}{\underset{|}{C}}-OH\\CH_2\\CH_2\\PH-\overset{|}{\underset{R^5}{C}}-OH\end{array}\right]_2$$

wherein M, $R^4$, $R^5$ and $m$ are as defined in claim 1.

5. The compound of claim 1 which is $$(CO)_5CrPH_2-\underset{CH_3}{\overset{CH_3}{\underset{|}{C}}}-OH$$

6. The compound of claim 1 which is $$(CO)_5CrPH_2-\underset{CH_2COCH_3}{\overset{CH_3}{\underset{|}{C}}}-OH$$

7. The compound of claim 1 which is $$(CO)_4Cr\overset{PH_2-\overset{CH_3}{\underset{|}{C}}\overset{OH}{\diagdown}}{\underset{PH_2-\overset{|}{\underset{CH_3}{C}}\diagdown OH}{\diagup}}CH_2$$

8. The compound of claim 1 which is $$(CO)_4Cr\overset{PH_2-\overset{C_6H_5}{\underset{|}{C}}-OH}{\underset{PH_2-\overset{|}{\underset{C_6H_5}{C}}-OH}{\diagdown}}$$

9. The compound of claim 1 which is $$(CO)_4Cr\overset{PH_2-\overset{CH_3}{\underset{|}{C}}-OH}{\underset{PH_2-\overset{|}{\underset{CH_3}{C}}-OH}{\diagdown}}$$

10. The compound of claim 1 which is $$(CO)_4Cr\overset{PH_2-\overset{OH}{\underset{|}{C}}\overset{CH_2}{\diagdown}CH_2}{\underset{PH_2-\overset{|}{\underset{OH}{C}}\diagdown CH_2 \diagup CH_2}{\diagup}}$$

11. The compound of claim 1 which is $$(CO)_4Mo\overset{PH_2-\overset{C_6H_5}{\underset{|}{C}}-OH}{\underset{PH_2-\overset{|}{\underset{C_6H_5}{C}}-OH}{\diagdown}}$$

12. The compound of claim 1 which is $$(CO)_4W\overset{PH_2-\overset{C_6H_5}{\underset{|}{C}}-OH}{\underset{PH_2-\overset{|}{\underset{C_6H_5}{C}}-OH}{\diagdown}}$$

13. The compound of claim 1 which is $$(CO_4)Cr\left[\begin{array}{c}PH-\overset{CH_3}{\underset{|}{C}}\overset{OH}{-CH_2}\\PH-\overset{|}{\underset{CH_3}{C}}-CH_2\\\overset{|}{OH}\end{array}\right]_2$$

14. The compound of claim 1 which is

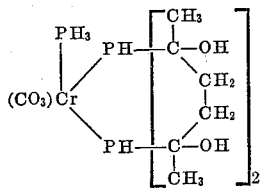

15. A method of reacting a carbonylmetalphosphine of the formula $(CO)_5MPH_3$ with a ketone of the formula $R—CO—R^1$ wherein M is chromium, molybdenum or tungsten;
R is alkyl of up to 8 carbons; and
$R^1$ is alkyl of up to 8 carbons or $CH_2COR$, under an inert atmosphere, at a temperature range of 20–120° C., in the presence of a catalyst selected from the group consisting of water, an alkali metal hydroxide, and a tri(lower alkyl)amine to produce a carbonyl(hydroxyhydrocarbylphosphine) metal compound.

16. A method of reacting a carbonylmetalphosphine of the formula $(CO)_4M(PH_3)_2$ with a ketone of the formula $R^2—CO—(CH_2)_n—CO—R^3$ wherein M is chromium, molybdenum or tungsten;
$n=0$ to 1;
$R^2$ and $R^3$, alike or different, are alkyl of up to 8 carbons; and
when $n=0$, hydrocarbyl aryl or alkaryl of up to 10 carbons or taken together are tetramethylene, under an inert atmosphere, at a temperature range of 20–120° C., in the presence of a catalyst selected from the group consisting of water, an alkali metal hydroxide, and a tri(lower alkyl) amine to produce a carbonyl(hydroxyhydrocarbylphosphine) metal compound.

17. A method of reacting one mole of a carbonylmetalphosphine of the formula $(CO)_{4-m}M(PH_3)_m$ with two moles of a ketone of the formula $$R^4—CO—(CH_2)_2CO—R_5$$

wherein
M is chromium, molybdenum or tungsten;
$m$ is 0 or 1; and
$R^4$ and $R^5$, alike or different, are alkyl of up 8 carbons, under an inert atmosphere, at a temperature range of 20–120° C., and in the presence of a catalyst selected from the group consisting of water, an alkali metal hydroxide, and a tri(lower alkyl)amine to produce a carbonyl(hydroxyhydrocarbylphosphine) metal compound.

References Cited

Buckler et al.: Tetrahedron 18 (1962), pp. 1211–9.
Fischer et al.: Angew. Chem. internat. edit. 8 (1969), pp. 377–8.

TOBIAS E. LEVOW, Primary Examiner
A. P. DEMERS, Assistant Examiner

U.S. Cl. X.R.
23—203 C, 360; 117—107.2 R; 260—429 J, 438.5 R

UNITED STATES PATENT OFFICE
CERTIFICATE OF CORRECTION

Patent No. 3,702,336   Dated November 7, 1972

Inventor(s) ULRICH KLABUNDE

It is certified that error appears in the above-identified patent and that said Letters Patent are hereby corrected as shown below:

Col. 1, line 3, "pH$_3$" should be -- PH$_3$ --.

Col. 1, in the structural formula occupying lines 60-65, "PH$^ε$" should be -- PH$_3$ --.

Col. 2, line 25, there should be no space before "metal".

Col. 2, line 40, in the first formula, "PH$_{32}$" should be -- PH$_3$ --.

Col. 4, line 37 "R$_1$=CH$_3$" should be -- R=CH$_3$ --.

Col. 4, line 38, "R=CH$_3$" should be -- R$^1$=CH$_2$COCH$_3$ --.

Col. 4, line 42, "pentadione" should be -- pentanedione --.

Col. 4, line 65, "Hz." should be -- Hz; --.

Col. 4, line 66, "Hz." should be -- Hz; --.

Col. 4, line 68 "Hz." should be -- Hz; --.

Col. 4, line 67, "at;" should be -- at --.

Col. 4, line 70, "at;" should be -- at --.

Col. 4, line 70, "variable" should be -- variable; --.

Col. 5, line 41, "at $\gamma$ " should be -- at $\tau$ --.

Col. 5, line 43 "at $\gamma$" should be -- at $\tau$ --.

Col. 5, line 44, "Hz $\gamma$ " should be -- Hz and $\tau$ --.

Page 2 (continued)

PO-1050
(5/69)

UNITED STATES PATENT OFFICE
CERTIFICATE OF CORRECTION

Patent No. 3,702,336         Dated November 7, 1972

Inventor(s) ULRICH KLABUNDE

It is certified that error appears in the above-identified patent and that said Letters Patent are hereby corrected as shown below:

Col. 6, line 26, "pentaedione" should be -- pentanedione --.

Col. 10, line 5, "(CO)$^\varepsilon$" should be -- (CO)$_3$ --.

Col. 10, line 15, "(CO$_3$" should be -- (CO)$_3$ --.

Col. 10, line 41, "triples" should be -- triplets --.

Col. 11, line 42, "hydracarbly" should be -- hydrocarbyl --.

Col. 11, in the formula occupying lines 66-70, "(PH$_2$)$_m$ should be -- (PH$_3$)$_m$ --.

Col. 14, line 9, "R$_5$" should be -- R$^5$ --.

Signed and sealed this 10th day of July 1973.

(SEAL)
Attest:

EDWARD M. FLETCHER, JR.         Rene Tegtmeyer
Attesting Officer               Acting Commissioner of Patents